United States Patent [19]
Bielfeldt et al.

[11] Patent Number: 6,006,655
[45] Date of Patent: Dec. 28, 1999

[54] COFFEE MACHINE AND FILTER ELEMENT THEREFOR

[75] Inventors: Uwe Bielfeldt, Bad Soden; Andreas Birk, Bad Homburg; Christof Kleemann, Kronberg; Reinhard Stücher, Freudenberg; Bernd Trebitz, Butzbach, all of Germany

[73] Assignee: Braun Aktiengesellschaft, Germany

[21] Appl. No.: 09/140,519

[22] Filed: Aug. 26, 1998

Related U.S. Application Data

[63] Continuation of application No. PCT/EP97/01226, Mar. 11, 1997.

[30] Foreign Application Priority Data

Mar. 12, 1996 [DE] Germany ............................ 196 09 561

[51] Int. Cl.⁶ .................................................. A47J 31/06
[52] U.S. Cl. .............................. 99/306; 99/304; 210/490; 210/495
[58] Field of Search ............................ 99/304, 306, 307; 426/82; 210/495, 490

[56] References Cited

U.S. PATENT DOCUMENTS

| | | | |
|---|---|---|---|
| 857,676 | 6/1907 | Rogers | 99/323 |
| 1,165,480 | 12/1915 | Wood | 99/304 X |
| 1,961,947 | 6/1934 | Sieling | 99/323 X |
| 1,972,264 | 9/1934 | Hirschhorn | 99/323 X |
| 3,089,405 | 5/1963 | Ackerman . | |
| 4,656,932 | 4/1987 | Kopp . | |
| 5,865,094 | 2/1999 | Kealy | 99/306 X |

FOREIGN PATENT DOCUMENTS

| | | |
|---|---|---|
| 1562008 | 4/1969 | France . |
| 1575181 | 6/1969 | France . |
| 2691059 | 11/1993 | France . |
| 1974198 | 8/1967 | Germany . |
| 1579354 | 10/1969 | Germany . |
| 44537 | 10/1970 | Germany . |
| 2034309 | 1/1972 | Germany . |
| 4130446A1 | 3/1993 | Germany . |
| 07275127 | 10/1995 | Japan . |
| 241385 | 7/1946 | Switzerland . |
| 453619 | 6/1968 | Switzerland . |
| 2028675 | 3/1980 | United Kingdom . |

*Primary Examiner*—Reginald L. Alexander
*Attorney, Agent, or Firm*—Fish & Richardson P.C.

[57] ABSTRACT

The present invention relates to an electic coffee machine and a filter element (1) therefor. The coffee machine includes a filter element (1) for taking up ground coffee (12) that is supported by a filter housing. A brewing head (2) is provided above the filter element (1) and has one or a plurality of outlet openings (3) from which water (14) heated by an electric water heater flows into the element (1) in order to extract the coffee. According to the present invention, the filter element (1) includes on its outside top edge (9) an annular collar (10) which extends at an angle relative to the edge (9). The filter element (1) is made of filter paper. Disposed below the annular collar (9) is a securing device (28) which bears the filter element (1) and on which the filter element (1) is supported in a substantially cantilevered manner. In this way, the filter element and the coffee machine are easier to handle. In addition, brewing results are improved and the dripping time is reduced.

22 Claims, 1 Drawing Sheet

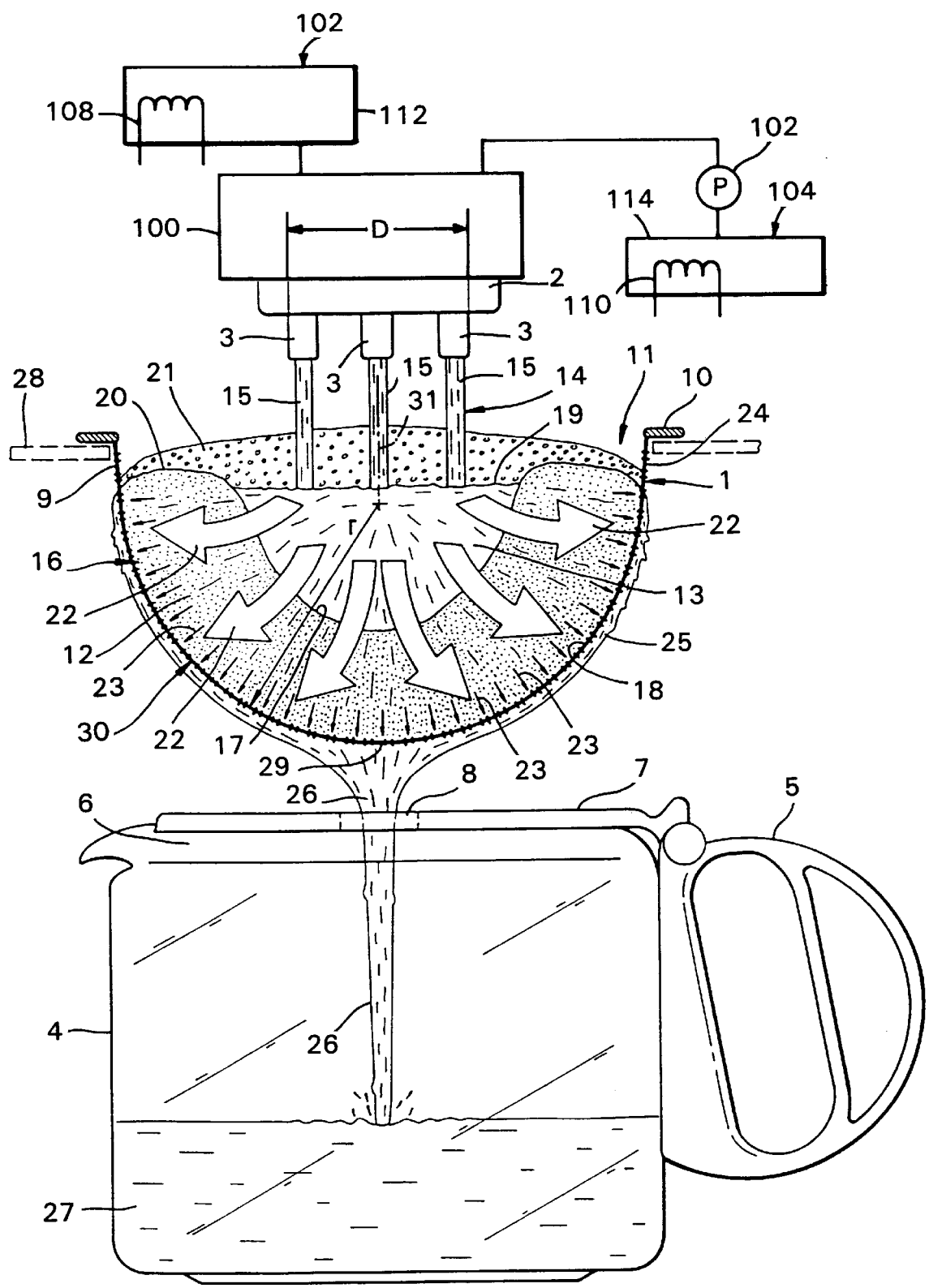
FIGURE

COFFEE MACHINE AND FILTER ELEMENT THEREFOR

BACKGROUND

This application is a continuation of PCT/EP97/01226 filed Mar. 11, 1997.

The present invention relates to an electric coffee machine which includes a filter element for receiving ground coffee that is supported by a filter housing and a brewing head provided above the filter element and having one or a plurality of outlet openings from which water heated by an electric water heater flows into the filter element to extract coffee, the filter element being hung into in the filter housing.

German patent application No. 41 30 446 discloses a coffee machine wherein the brewing head includes an outlet opening provided above the coffee filter, from which water heated in a continuous flow heater or a water tank flows off and enters into the top opening of the coffee filter to soak and extract the coffee grounds disposed below the opening. The prepared coffee brew is discharged through an outlet opening into the coffee container placed beneath it.

In most coffee machines, as is the case in the above-mentioned coffee machine, the filter element is made of paper and has a generally truncated-cone shape when the filter element is placed into the filter housing. It occurs in the brewing process that the ground coffee is not sufficiently evenly penetrated by the water and, thus, the ground coffee is not appropriately extracted. This is often recognized by coffee grounds in the area of the bottom corners of the coffee filter which are not extracted, or insufficiently.

A paper filter as has been described in the electric coffee machine described in the present application is also disclosed in German patent application No. 20 34 309. The ground coffee is insufficiently extracted in this embodiment also when the coffee is not brewed automatically, but manually, for example. This is because even in this case the hot water is not conveyed properly into the corners in the bottom area of the filter element. Also, it has been found in such a brewing process that, due to the splash-like infusion of the water on the ground coffee, the ground coffee is repeatedly whirled up so that finest components of the ground coffee float on the surface and deposit there. The final result is that the hot water is prevented from sufficiently rapidly penetrating the coffee grounds so that the extraction time is extended accordingly. At the end of the brewing process, the dripping time starts which also takes a rather long time because the water flows too slowly through the compressed coffee grounds. Further, far too much ground coffee collects at the corners and at the edge and is not sufficiently extracted.

German utility model No. 7037082 also discloses a conical filter element which is suspended into the opening of a cup. In this case, too, less favorable extraction results are achieved due to the acute cone configuration of the filter element.

German patent application No. 15 79 354 discloses a filtering device where the filter element made of paper is placed into the opening of a filter housing. The filter element bears against the inside surface of the ribs provided on the filter housing and against the groove areas between the ribs which, as is most frequently the case in up-to-date coffee machines, impede the discharge of the filtrate from the filter element. This is especially due to the moist filter paper becoming typically curved so that a large part of the outside filter surface is blocked. It is true that the bottom of the filter element has a concave configuration. However, it is supported on the ribs and the grooves in the filter element so that the extracted coffee is impeded from flowing off the filter element because the ribs and the grooves cover the outside surface of the filter element.

In addition, U.S. Pat. No. 4,656,932 discloses a bowl-shaped filter housing having a recess in which a bowl-shaped filter element is inserted which tapers conically in a downward direction. The outside surface of the filter element is undulated. The filter element abuts the bottom and the side wall of the filter housing so that the off-flow of the coffee brew is rather impaired also in this case. In this prior art, too, the distances the water has to cover in penetrating the ground coffee until the water reaches the filter element are differently long due to the bowl-shaped configuration of the filter element which tapers conically in a downward direction.

U.S. Pat. No. 3,089,405 discloses a filtering device for a coffee machine of the type described hereinabove which is used to make brewed beverages. The filtering device includes a ring-shaped portion of a water pipe, termed ring pipe in short, on the outside of which a filter paper is freely suspended. The filter paper can be filled with ground coffee, and hot water can be introduced through the filter opening for filtration purposes. The hot water enters through the open end of the annular water pipe and flows off, after having taken extraction substances (extraction process) from the product being extracted, freely on the outside wall of the filter paper. The brew is collected in a container placed therebeneath.

To insert the filter paper, it is attached to the filter support by a retaining means. To this end, an elastic strip or an elastic cord runs in the top end of the filter paper and, along with the opening of the filter paper, is drawn from the outside around the ring pipe designed as filter support. After the expanded opening of the filter paper above the ring pipe has been let loose, the elastic cord tightens so that the diameter of the filter paper above the ring pipe becomes smaller than the portion around the ring pipe. This way, the filter paper is attached to the ring pipe to prevent it from falling on the bottom during the brewing process.

Apart from the comparatively complicated fitting of the filter paper to the ring pipe (because the opening of the filter paper must be opened by expanding the elastic cord until it can be drawn from below over the outside surface of the ring pipe), it is also very complicated to pull an elastic strip or an elastic cord into the top end portion of the filter paper when the filter element shall be retained on the filter support by the elastic cord.

This way of attaching a filter paper to a filter support of a machine which prepares brewed beverages is lengthy and complicated because it finally depends on the person using it how skillful the opening of the filter element is expanded to be subsequently slipped over the ring pipe and how properly the filter element is thereafter aligned on the filter support in order that the longitudinal axis of the filter element extends substantially vertically. With an improper installation, it may easily occur that the filter paper cone is hung in transversely, is torn and/or even drops from the filter support, which may seriously scald the attendant.

The necessity to use an elastic cord or rubber ring which is specially fitted to the filter element and the complicated mounting of the rubber ring on the filter paper is little comfortable and increases the price for each single filter paper. Increased costs become apparent especially when coffee is brewed several times a day. Therefore, a filter paper attachment of this type is advisable for application only if the filter element itself is made of a stable filtering material.

SUMMARY OF THE INVENTION

An object of the present invention is to provide a coffee machine of the type described hereinabove and a filter element for the extraction of coffee which makes handling easier.

According to one aspect of the present invention, this object is achieved by security device to attach the filter element. This permits greater ease of handling the filter element and suspending it into the coffee machine. Embodiments of this aspect of the invention may include one or more of the following features. The securing device is a part of the filter housing of the coffee machine. The coffee brew is not impeded to flow off the filter element and may do so substantially evenly over the entire outside surface.

An extraction of the ground coffee in the filter element as uniform as possible, with a continuously entering flow of hot water into the filter element, is achieved because the filter element has a concave design to provide a maximum large outside surface, and is suspended in addition. Due to the even flow of water, the ground coffee is least possible whirled up, thereby preventing finest coffee particles from settling on the surface of the coffee grounds which increasingly shut off the coffee bed against the penetration of hot water. Additionally, the ground coffee is not excessively whirled up and condensed by the largely continuous water flow, with the result that the ground coffee remains relatively porous, and good extraction results may be achieved. Because the filter element is freely suspended, the coffee brew can leave it without being impeded and may do so in a generally even manner over the entire outside surface.

It occurs during the brewing process that the ground coffee settles down on the wall of the filter element and is not whirled up again what would saturate the fine particles and, thus, make the coffee bed more or less impermeable. In order to achieve a hot water flow into the filter element which is as continuous as possible, it is possible to use continuous flow heaters or also water tanks. However, the heating capacity in continuous flow heaters must be rated so that a sufficient amount of water is permitted to largely continuously discharge from the outlet openings in dependence on the cross-sectional dimensions of the openings. Overflow of the filter element is prevented in this filter system because the coffee flows off evenly from all sides of the filter element. The reason is that the coffee bed is generally uniform and not compressed due to the subsided brewing process.

It is of course also possible to choose paper filters as a filter element which have an undulated surface. However, their envelope curve presents a concave surface which is curved outwardly towards the receptacle and is preferably of a hemispherical design. This provides a particularly large filtering surface on which the ground coffee sits evenly from inwards. The fact that hot water penetrates the ground coffee almost uniformly can also be seen in temperature measurements which show almost identical temperatures in almost the entire coffee bed area. This is because if some areas were scarcely penetrated by hot water, considerably lower temperatures would occur in these areas, as is described in the state of the art. The filter element may also be slightly elliptical and adopt an outwardly curved homogeneous shape. It is also important that the outlet openings are generally arranged in the central area of the filter element above the filter element in the brewing head of a coffee machine so that the ground coffee is prevented from being whirled up. A large-surface water shower, however, supports the whirling up of the ground coffee, which is not desired.

When the filter element is exclusively made of filter paper, it can be encompassed by a securing device by way of which the filter element is hung in the coffee machine. However, it is also possible that the paper filter element for its support is encompassed by a grid-type net which is also concave or spherical and thus adapted to the shape of the filter element. The grid is provided with the securing device by way of which the filter element is supported on the grid, and the grid, in turn, is supported on the filter support. The extracted coffee may penetrate the filter element almost unimpededly and flow off on the outside thereof.

Further preferred aspects of the present invention can be seen in the claims. For example, the edge can be made of the same filter paper material as the remaining part.

BRIEF DESCRIPTION OF THE DRAWING

FIG. 1 is a partially sectional, partially schematic illustration of a coffee maker.

DETAILED DESCRIPTION OF THE PREFERRED EMBODIMENT

One single embodiment is shown in the drawing and will be described in detail hereinbelow.

The only FIGURE shows a principal view of the present invention, wherein above the filter element 1 (which is hemispherical in the drawing) there is a brewing head 2 which includes in its bottom side three outlet openings 3 that extend substantially centrally to the filter element 1. Instead of three outlet openings 3, it is also possible to use a larger or smaller number of openings. In this case, however, the outlet cross-section must be chosen to be correspondingly larger or smaller. The filter element 1 has a radius r of roughly 40 to 70 mms, more particularly 60 mms (for 12 cups), and the outlet openings 3 are arranged in a diameter range D of roughly 20 to 60 mms, more particularly 40 mms, or smaller. The brewing head 2 is part of a coffee machine which can include a storage tank 100 above brewing head 2 and electric water heater 102 (located above the brewing head) or water heater 104 (located below the brewing head) and pump 106. Heaters 102, 104 can include a heating device 108 or 110 in a tank 112 or 114, respectively. Placed below the filter element 1 is a coffee pot 4, preferably a glass container, with a handle 5. The opening 6 of the coffee pot 4 is closed by a cover 7 which has a central inlet opening 8.

The filter element 1 extends at its outside top edge 9 slightly conically outwardly and terminates into an annular collar 10 which extends at an angle to edge 9. The annular collar 10 is also made of paper and is either integral with the filter element 1, or it is attached to the filter element, for example, by cementing, flanging, thermofixation, caulking, or any other simple type of attachment.

As can further be clearly seen in the FIGURE, the accommodating space 11 of the filter element 1 contains ground coffee 12 which normally piles up after being filled in. In the only FIGURE, the ground coffee 12 includes in its central area 31 a crater-like indentation 13 which is flushed out by the inflowing water 14 during the brewing process. In this embodiment, the three outlet openings 3 are positioned so close to one another that a substantially hemispherical indentation 13 is produced in the brewing process. However, it is also possible that the individual hot water jets 15 form individual local indentations (not shown) which are slightly separated from each other when the outlet openings 3 are not arranged side by side but in a circle.

Best extraction results are achieved when the indentation 13 becomes substantially hemispherical, as is shown in the only FIGURE, so that the coffee bed 16 provided by the ground coffee 12 with its inside surface 17 follows the spherical wall 18 of the filter element 1.

It is true that the central area of the coffee bed 16 can be grooved to a slightly greater extent (what is not shown in the FIGURE) in order to thereby adapt the penetration speed of the hot water 15 in the deepest area to roughly the penetration speed in the lateral area. This is because the coffee bed 16 is compressed most in the deepest area so that, due to the higher hydrostatic pressure of the water 14 in this area, the water 14 will flow off in this area exactly as quickly as in the higher lateral area which is less compressed.

As is clearly shown in the FIGURE, the maximum water level 19 does not considerably exceed the top fringe area 20 of the coffee bed 16 because the extraction speed is relatively high. Coffee foam 21 forms only on the surface of the water level 19 due to rising bubbles which are produced when the ground coffee 12 is soaked or wetted. The hot water 14 passes through the ground coffee 12 comparatively uniformly (as is indicated by the large arrows 22) due to the filter element 1 of the present invention and the continuous introduction of hot water 14 into the filter element 1 and the substantially freely suspended filter element 1. The brew extracted from the ground coffee 12 also flows off from the filter element 1 itself, what is indicated by the small arrows 23. As can be seen in the FIGURE, a downript stream of coffee 25 may form on the outside surface 24 of the filter element 1, unimpeded to flow to the deepest point of the filter element where it is then bundled in a joint jet 26. Jet 26 will then flow through the opening 8 in the cover 7 into the pot 4 where it is collected as beverage 27.

Below the annular collar 10, a securing device 28 may be mounted which is used to hinge the filter element 1. This facilitates handling the filter element 1 and provides greater ease of hanging it into the coffee machine or a receptacle 4. However, it is also possible to hang the filter element 1 into the securing device 28 by way of the annular collar 10. The securing device 28 is a part of the filter housing of the coffee machine in this case.

It is true that the ground coffee 12 collapses at the points where the water jets 15 strike which eject from the outlet openings 3 arranged centrally on the brewing head 2, and the ground coffee 12 is condensed in the bottom area of these craters or indentations 13. The remaining ground coffee 12, however, stays comparatively loose and is a good drainage for the hot water 14. Also, the ground coffee 12 may swell without difficulty so that the coffee bed 16 is quickly and thoroughly saturated. The result is a good extraction of the ground coffee 12. Filter overflow is prevented.

After the brewing process has been completed, that means, as soon as the hot water 14 has stopped flowing out of the outlet openings 3, the hot water 14 will pass through the porous ground coffee 12 until the filter element 1 has run empty. Now the dripping time starts. After a few drips already, i.e., approximately after five to eight drips which drip off from the outside surface 24 of the filter element 1 at the lowest point 29 thereof the last drip will not drop off but will even be sucked in inwardly by the sponge-like coffee bed, by way of the filter element 1, due to evaporation on the filtering surface and occurring capillary action, with the result that the drip has disappeared from the outside surface 24 (not shown). Especially due to the sponge-type, porous coffee bed 16, the dripping time is reduced considerably and now is at a rate of 30 seconds approximately, compared to 2 to 3 minutes formerly.

A particularly large active filtering surface 30 is achieved by the filter element 1 according to the present invention, and the convex or spherical configuration of the filter element 1 permits distributing the ground coffee 12 in the filter element 1 so that an identical way of extraction is caused in all directions vertically to the inside wall 18. This means, the way the water 14 takes from the crater-shaped indentations 13 through the ground coffee 12 is roughly equally large at all points. The result is a particularly short filtration process which economizes in about two to three minutes, with the same number of cups, compared to conventional filtration processes.

What is claimed is:

1. Electric household coffee machine comprising:
    a filter element for receiving ground coffee through a top opening thereof;
    a filter housing supporting the filter element;
    an electric water heater; and
    a brewing head provided above the filter element and having one or more outlet openings from which water heated by the electric water heater flows through the opening onto the ground coffee to extract the coffee,
    wherein the filter element is hung into the filter housing, the filter element has an outside upper edge and an annular collar which extends at an angle relative to the edge, the filter element, including the edge and the annular collar, is integrally made from filter paper,
    wherein the housing includes a securing device which is located below the annular collar and which essentially bears the filter element, and wherein an outside wall of the filter element is essentially spaced from the filter housing by such an amount that the brewed beverage discharges through the wall of the filter element and is not impeded in flowing down the outside wall thereof.

2. Electric coffee machine as claimed in claim 1, wherein the securing device is a part of the filter housing of the coffee machine.

3. Electric coffee machine as claimed in claim 2, wherein the filter element is essentially freely suspended in the securing device of the coffee machine.

4. Electric coffee machine as claimed in claim 1, wherein the wall of the filter element through which the brewed beverage discharges has a generally concave design.

5. Coffee machine as claimed in claim 4, wherein the flow cross-section of the outlet opening(s) and the hot water supply are dimensioned such that the hot water discharges in a generally continuous water flow.

6. Coffee machine as claimed in claim 5, wherein the brewing head comprises an intermediate hot water storage tank and a bottom of the intermediate storage tank includes the one or more outlet openings.

7. Coffee machine as claimed in claim 1, wherein the water heater comprises a self-feeding continuous flow heater.

8. Coffee machine as claimed in claim 7, wherein the continuous flow heater has a heating capacity ranging between 1200 and 2000 watt.

9. Coffee machine as claimed in claim 1, wherein the water heater comprises a water tank equipped with a heating device.

10. Coffee machine as claimed in claim 9, wherein the water tank is provided above the brewing head.

11. Coffee machine as claimed in claim 9, wherein the water tank is provided beneath the brewing head, and a pump driven by an electric motor is mounted in a hot water line which leads to the brewing head.

12. Coffee machine as claimed in claim 1, wherein the filter element is encompassed by a net-type grid which is adapted to the shape of the filter element.

13. Coffee machine as claimed in claim 12, wherein the grid includes the securing device.

14. Coffee machine as claimed in claim 12, wherein the grid has a mesh size of 2 to 10 mms.

15. Coffee machine as claimed in claim 12, wherein the grid comprises rustproof wire.

16. Electric coffee machine as claimed in claim 4 wherein the outlet opening(s) at the brewing head is (are) arranged generally centrally relative to the filter element.

17. Electric coffee machine as claimed in claim 8 wherein the continuous flow heater has a heating capacity of about 1600 watt.

18. Electric coffee machine as claimed in claim 1 wherein the filter element, including the edge and the annular collar, is integrally made from a single piece of filter paper.

19. Filter element made of filter paper for use in a coffee machine or tea machine, wherein an outside surface of the filter element has an envelope curve of a convex design, and wherein the filter element on its outside upper edge has a radially outwardly directed annular collar which extends at an angle relative to the edge wherein the filter element has a generally hemispherical configuration, an upper area of the edge of the filter element expands conically outwardly, and the annular collar succeeds the conically expanded portion, and wherein the filter element including its edge and the annular collar, is integrally made from filter paper.

20. Filter element as claimed in claim 19, wherein an inside wall of the hemispherical portion has a radius (r) of 35 to 70 mms approximately.

21. Electric coffee machine as claimed in claim 20 wherein the radius (r) is about 60 mms.

22. Electric coffee machine as claimed in claim 19 wherein the filter element, including the edge and the annular collar, is integrally made from a single piece of filter paper.

* * * * *